United States Patent
Wünning et al.

(10) Patent No.: US 8,622,736 B2
(45) Date of Patent: Jan. 7, 2014

(54) RECUPERATOR BURNER HAVING FLATTENED HEAT EXCHANGER PIPES

(75) Inventors: Joachim G. Wünning, Leonberg (DE); Joachim A. Wünning, Leonberg (DE)

(73) Assignee: WS-Wärmeprozesstechnik GmbH, Rennigen (DE)

(*) Notice: Subject to any disclaimer, the term of this patent is extended or adjusted under 35 U.S.C. 154(b) by 870 days.

(21) Appl. No.: 12/592,341

(22) Filed: Nov. 23, 2009

(65) Prior Publication Data
US 2010/0112502 A1 May 6, 2010

Related U.S. Application Data

(63) Continuation-in-part of application No. PCT/EP2008/003603, filed on May 6, 2008.

(30) Foreign Application Priority Data

May 23, 2007 (DE) .................................. 07010224

(51) Int. Cl.
*B01J 7/00* (2006.01)

(52) U.S. Cl.
USPC ............. 431/215; 431/158; 431/116; 431/10; 165/4; 165/157; 165/158; 165/177; 165/125

(58) Field of Classification Search
USPC ............. 431/215, 158, 161; 165/157, 165, 4, 165/158, 177
See application file for complete search history.

(56) References Cited

U.S. PATENT DOCUMENTS

| 4,574,710 | A | | 3/1986 | Pickard |
| 4,877,396 | A | * | 10/1989 | Wunning ............... 431/158 |
| 5,154,599 | A | * | 10/1992 | Wunning ............... 431/215 |
| 6,033,208 | A | * | 3/2000 | Wunning ............... 431/215 |
| 6,973,965 | B2 | * | 12/2005 | Meshenky .............. 165/125 |
| 7,166,139 | B2 | * | 1/2007 | Wunning .............. 48/214 R |
| 7,762,807 | B2 | * | 7/2010 | Linck et al. ............ 431/215 |
| 2006/0101848 | A1 | * | 5/2006 | Taras et al. ............. 62/515 |
| 2006/0124284 | A1 | | 6/2006 | Ushio et al. |

FOREIGN PATENT DOCUMENTS

| CN | 100035 | 9/2010 |
| DE | 21 02 744 A1 | 8/1972 |
| EP | 0 324 043 A1 | 7/1989 |
| EP | 0 463 218 A1 | 1/1992 |
| GB | 925 730 A | 5/1963 |
| JP | 03 094941 | 4/1991 |
| WO | 96/20808 A | 7/1996 |
| WO | 02/085781 A | 10/2002 |
| WO | 2005/084771 A | 5/2005 |

\* cited by examiner

*Primary Examiner* — Steven B McAllister
*Assistant Examiner* — Nikhil Mashruwala
(74) *Attorney, Agent, or Firm* — Klaus J. Bach

(57) ABSTRACT

In a highly efficient recuperator burner, which comprises at least one combustion chamber for warm-up operation and is otherwise set up for FLOX® operation, and a recuperator for preheating combustion air by means of thermal exhaust gas energy in a counter-current heat exchange mode via heat exchanger pipes, each heat exchanger pipe has, in a heat exchange section thereof, a flattened gap cross-section and, at its end facing a volume to be heated, a nozzle cross-section, which differs from the flattened gap cross-section of the heat exchanger pipe.

9 Claims, 3 Drawing Sheets

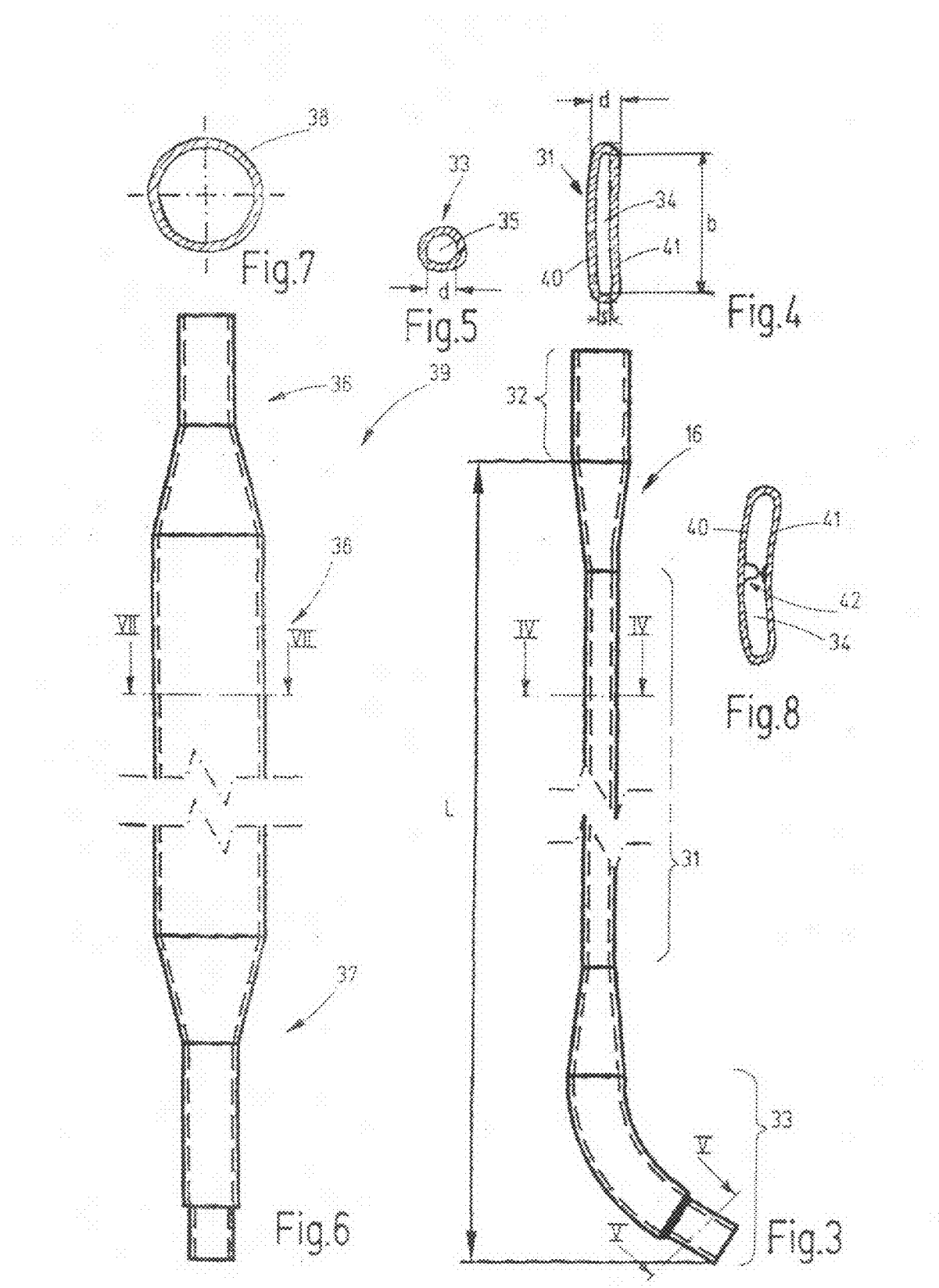

RECUPERATOR BURNER HAVING FLATTENED HEAT EXCHANGER PIPES

This is a continuation-in-part application of pending international patent application PCT/EP2008/003603 filed May 6, 2008 and claiming the priority of German application 07010224.9 filed May 23, 2007.

BACKGROUND OF THE INVENTION

The invention relates to a recuperator burner for heating a volume such as a furnace space, or also the interior space of a jet pipe.

Recuperator burners are used e.g. for the direct or indirect heating of industrial furnaces. In direct heating, the oxidation of the fuel takes place in the furnace space. In indirect heating, for example by means of a jet pipe, the combustion takes place within a pipe (jet pipe) that extends into the furnace space but is closed relative to said furnace space, thus causing said pipe to be heated and to emit thermal radiation.

An example of a recuperator burner, with or without jet pipe, is disclosed by document EP 0 685 683 B1. Herein, the recuperator is located in the furnace wall and has a typical length of 400 mm and, depending on burner output, a diameter of 100-300 mm. This recuperator consists of ribbed segments of high-temperature cast steel or also of ceramic material. In order to reduce the generation of nitrogen oxide, a strong exhaust gas recirculation is established in the heated volume, thus leading to a so-called "flameless oxidation." This operation is also referred to as FLOX® operation (FLOX is a registered trademark of WS-Warmeprozesstechnik GmbH). Burners of this design have an efficiency of 65 to 75%.

The same publication also discloses a regenerator burner. This regenerator burner comprises two heat-storing regenerators that are alternately heated by exhaust gas, or they release their thermal energy to the supplied combustion air. Such regenerator burners achieve an efficiency of up to 90%. However, due to the control arrangement required for the alternating operation of the two regenerators to achieve the constant flow reversals, such an arrangement causes increased expenses and efforts for installation and control.

It is therefore the object of the present invention to provide a recuperator burner with simplified operability and improved operating efficiency.

SUMMARY OF THE INVENTION

In a highly efficient recuperator burner, which comprises at least one combustion chamber for warm-up operation and is otherwise set up for FLOX® operation, and a recuperator for preheating combustion air by means of thermal exhaust gas energy in a counter-current heat exchange mode via heat exchanger pipes, each heat exchanger pipe has, in a heat exchange section thereof, a flattened gap cross-section and, at its end facing a volume to be heated, a nozzle cross-section, which differs from the flattened gap cross-section of the heat exchanger pipe.

The recuperator burner in accordance with the invention comprises a recuperator that contains several pipes of heat-resistant material, said pipes being used for preheating the combustion air and potentially also the fuel gas or a part thereof when low-energy gases such as, for example, landfill gases are used as fuel. The heat exchanger pipes of the recuperator burner are flattened so as to form in the section provided for heat exchange, an interior space with a flattened gap cross-section. Since the heat transfer coefficient α is inversely proportional to the gap width s, when a laminar flow exists in the gap, extremely high α values are achieved with small gap widths. Preferably, the pipes are exposed to the exhaust gas on the outside the combustion air flows through the pipe interior. On their end facing the gas volume to be heated, the pipes have a nozzle cross-section that differs from the gap cross-section. The nozzle cross-section is for example circular. This cross-section permits the acceleration of the combustion air flow and the formation of an exit jet that enters the volume to be heated at high speed and causes a recirculation of the exhaust gas. Preferably, the nozzle cross-section is dimensioned in such a manner that jet velocities of e.g., 100 m/sec. are achieved. As a result of this, an exhaust gas recirculation factor of e.g. 4 or 5 is reached, thus largely preventing the development of temperature peaks and the generation of thermal NOx in the exhaust gas.

Preferably, the gap cross-section is greater than the nozzle cross-section. Consequently, a lower flow rate is present in the gap region than in the nozzle. The heat exchanger pipes are preferably provided with at least one tapered end, said end having a circumference that is smaller than the circumference of the flattened heat exchanger pipe section. Preferably, such a pipe is manufactured in that a pipe having a circumference corresponding approximately to the circumference of the later heat exchanger pipe section is tapered on at least one end, preferably however at both ends, i.e., the diameter is reduced, thus reducing the pipe cross-section, for example, by a forming process. Subsequently, the heat exchanger pipe section is pressed flat in order to provide the desired gap shape. In this instance, preferably a pipe gap width s<3 mm and a pipe gap length b>4 s are maintained.

On the cold side, the ends of the heat exchanger pipes may be mounted—for example, by soldering—in a sealed manner in the openings of an orifice plate. Preferably, the heat exchanger pipes are attached only at one end. On the hot end, they may optionally be fixed to each other by joining means such as a ribbon or a welding spot, or they may remain free. In either case, they may freely expand. All the pipes may have the same shape and may be manufactured in series production.

It is possible—by appropriate bending of the hot ends of the heat exchanger pipes—to pre-specify a jet direction as desired. For example, jet pipes arranged in a circle may have nozzle ends whose axes are located on the envelope of a cone.

On the one hand, said heat exchanger pipes achieve a good heat transfer from the exhaust gas to the combustion air and, on the other hand, they generate only a minimal loss of pressure. This is achieved, in particular, when the cross-section of the flattened gap-shaped section is greater than the cross-section of the discharge nozzle. In so doing, the flow speed in the gap cross-section becomes smaller than in the nozzle.

Furthermore, the exhaust gas passages between the pipes may be configured with a slightly greater gap width in order to reduce the pressure loss also in the exhaust gas passages. The heat transfer that is potentially reduced as a result of this can be compensated for by auxiliary heating surfaces in the form of corrugated sheet metal inserts. These may act at the same time as spacers between the heat exchange pipes. The corrugated sheet metal inserts and/or the heat exchange pipes may furthermore be coated with a catalytically active material—at least in some areas—so as to act as catalysts for exhaust gas cleaning.

The flattened pipes are preferably arranged in the form of a circle or a ring. They may be arranged in several rings that are concentric to each other. If uniform flattened pipes are used, gaps may occur in the individual rings, which may be closed by webs.

The recuperator burner is designed so as to bring about a flameless oxidation in a heated volume in that, due to the preheated air which is being injected in jets, an exhaust gas recirculation in front of the recuperator burner is established whereby supplied fuel is oxidized in a high-speed gas stream having a high content of inert gas. This mode of operation is suitable for a furnace space that has been preheated to above 800° C.

Optionally, it is possible to provide another mode of operation for operating the recuperator burner in a furnace space at a temperature below the ignition temperature (approximately 800° C.). To do so, the recuperator burner comprises a combustion chamber, into which at least a portion of the combustion air and of the fuel gas may be introduced for combustion therein. In the combustion chamber, a flame is generated, whose hot exhaust gases possibly together with flames exit the burner and thus heat the volume.

Optionally, a third mode of operation may be provided, this mode being potentially referred to as boosted or assisted FLOX® mode. This mode of operation is appropriate for operating the recuperator burner as long as temperatures below the ignition temperature prevail in the heated volume. In this mode, part of the oxidation is effected in the combustion chamber of the burner. The hot exhaust gases in this kind of combustion enter—together with the combustion air and a portion of the fuel—in jets the furnace space and, there, assist in the oxidation of fuel injected into the furnace space.

The invention and advantageous embodiments thereof will become more readily apparent from the following description on the basis of the accompanying drawings. The description is restricted to essential aspects of the invention and to various situations. The drawings disclose additional details.

BRIEF DESCRIPTION OF THE DRAWINGS

FIG. 3 is a side view of a heat exchanger pipe of the recuperator in accordance with FIG. 2;

FIG. 4 is a cross-sectional view, taken along line IV-IV of FIG. 3, of the heat exchanger pipe;

FIG. 5 is a cross-sectional view, taken along line V-V in FIG. 3, of the heat exchanger pipe in accordance with FIG. 3;

FIG. 6 is a side view of a preformed heat exchanger pipe prior to flattening its heat exchanger section;

FIG. 7 is a cross-sectional view, taken along line VII-VII, of the heat exchanger pipe in accordance with FIG. 6; and FIG. 8 is a sectional view, taken along line. IV-IV of FIG. 3, of a modified embodiment of a heat exchanger pipe.

DESCRIPTION OF PARTICULAR EMBODIMENTS

Figure 1:
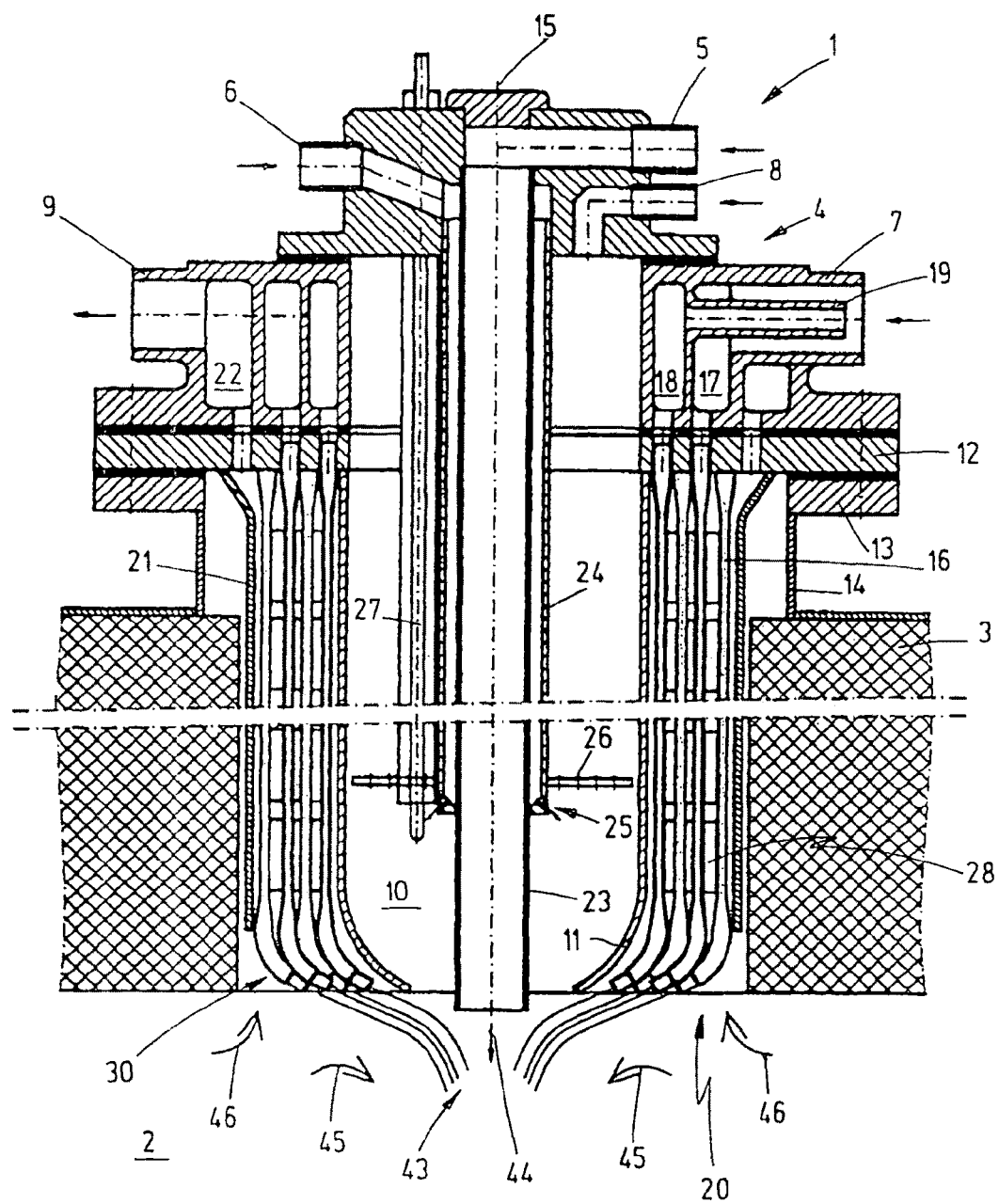
FIG. 1 shows, in a longitudinal cross-sectional view, an illustration of the recuperator burner according to the invention disposed in a furnace wall.

FIG. 1 shows a recuperator burner 1 which is used for heating a furnace space 2 and, to do so, is arranged in an opening of a furnace wall 3. The recuperator burner comprises a burner head 4 for supplying combustion air and fuel to the burner and for removing exhaust gases. To accomplish this, a FLOX® gas connection 5, a warm-up gas connection 6, a FLOX® air connection 7, a warm-up air connection 8 and an exhaust gas connection 9 for the exhaust gas exit are provided on the burner head 4. The FLOX® gas connection 5 and FLOX® air connection 7 are used for the supply of liquid vaporous or gaseous fuel and air for the operation of the recuperator burner 1 with flameless oxidation in the furnace space 2. The warm-up gas connection 6 and the warm-up air connection 8 are used to heat up a combustion chamber 10 in the recuperator burner 1.

The recuperator burner includes a combustion chamber 10 which is formed by a pipe 11 with an open end that tapers toward the furnace side, and is supported at its other end by a flange plate 12. As shown in FIG. 1, the flange plate 12 is disposed between the burner head 1 and a flange 13 with appropriate seals interposed between the burner head and the flange 13 which may be supported via a tubular socket 14 on the furnace wall 3. The flange plate 12 is provided with a number of bores that are preferably located on concentric circles around the pipe 11 and the central axis 15 of said pipe. Inserted in the bores are heat exchanger pipes 16 consisting for example of high-temperature steel. The pipes 16 are sealingly secured in the flange 12 by suitable joining means such as, for example, brazing solder connections. The bores extend in the burner head to an air distributor channel 17. Possibly, a few of the bores may extend to an additional distributor channel 18 which is in communication with a separate connection 19. Preferably, the connection 19 is arranged concentrically in the FLOX® air connection 7. In this manner, normally sufficient air is supplied to the heat exchanger pipes 16 to maintain the flameless oxidation. However, it is also possible to supply other fluids such as, for example, combustible gas, to the distributor channel 18 via the connection 19, as the distributor channel 18 is separate from the air distributor channel 17, in order to preheat said gas.

The heat exchanger pipes 16 are arranged in an annular exhaust gas channel 20 which is formed by an outer pipe 21 which is supported at one end by the flange plate 12. The exhaust gas channel leads to an exhaust gas collector 22 in the burner head 4.

In the pipe 11, there is a fuel pipe 23 in the form of a central gas lance that is arranged so as to be concentric to the central axis 15 for supplying fuel to the furnace 2 for FLOX® operation. Concentric with the fuel pipe 23, there is another pipe 24 communicating with the preheating gas connection 6, whereby gas discharge openings 25 are provided at the end of said pipe 24. These gas discharge openings generate fuel jets which are inclined with respect to the central axis 15. At some distance from the gas exit openings 25, a perforated plate 26 for vortexing the air which has been introduced into the combustion chamber 10 is provided on the pipe 24. In addition, preferably an ignition and monitoring electrode 27 extends into the combustion chamber 10.

Figure 2:
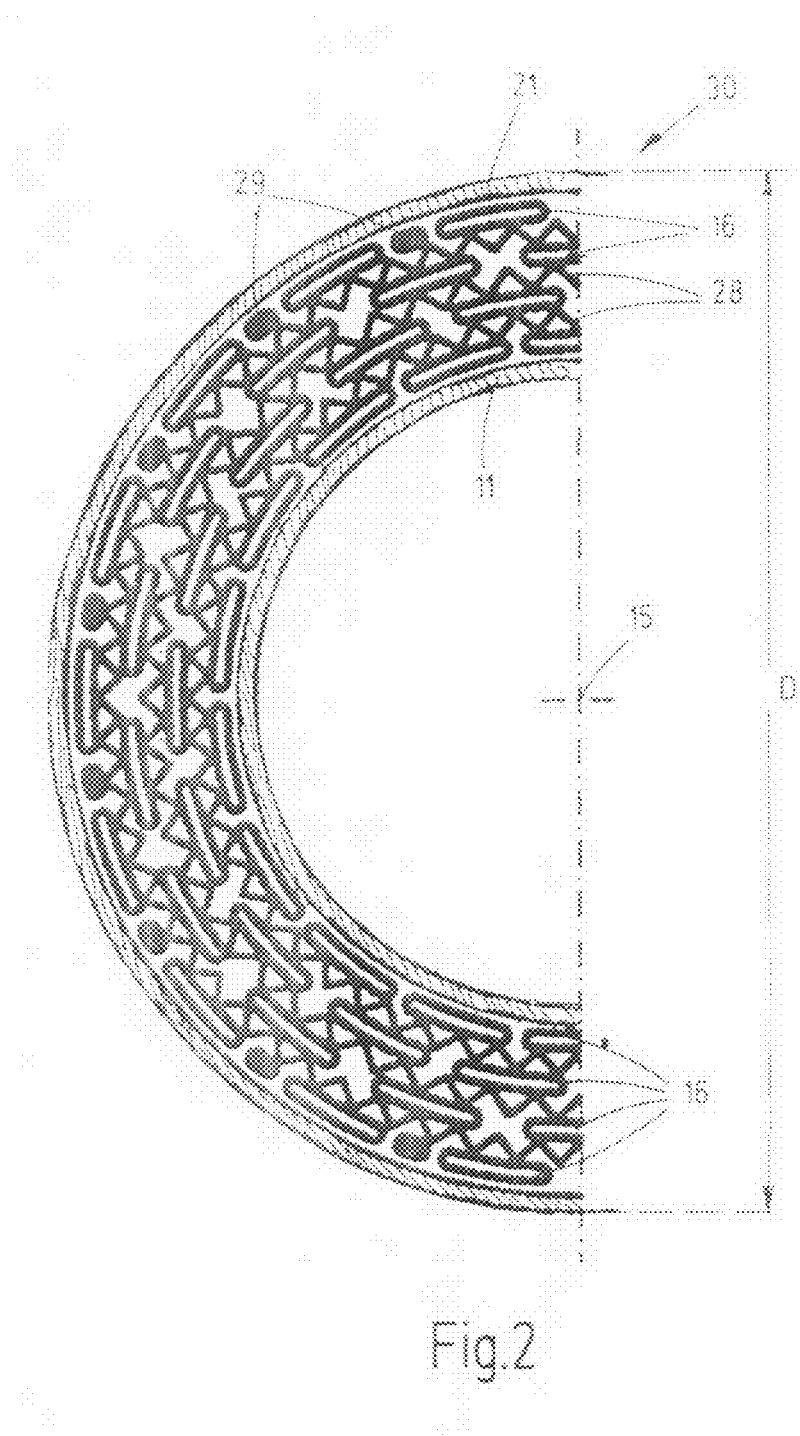
FIG. 2 is a cross-sectional view of the recuperator of the recuperator burner in accordance with FIG. 1.

Preferably, all of the heat exchanger pipes 16 have essentially the same configuration. Provided between them are filler elements, for example, in the form of corrugated sheet metal elements 28 that are particularly apparent from FIG. 2. The corrugations of said elements are in contact with the heat exchanger pipes 16 that are arranged in several circles concentric with the central axis 15, thus holding the heat exchanger pipes 16 in a spaced relationship. In addition, they transfer the thermal energy absorbed from the exhaust gas stream in a convective manner—and by heat radiation—to the heat exchanger pipes 16. The corrugated sheet metal elements 28 consist of high-temperature steel, for example. Their corrugations preferably extend parallel to the central axis 15. In addition, as is shown by FIG. 2, strips 29 may be provided between the heat exchanger pipes 16 in order to avoid the formation of excessively large spaces between the heat exchanger pipes 16. The heat exchanger pipes 16 as well as the corrugated sheet metal elements 28 may be coated fully or in part with catalytically active material 16a, 28a, preferably for exhaust gas treatment.

Together with any strips 29 present and with the corrugated sheet metal elements 28, and ultimately also the pipes 11 and 21, the heat exchanger pipes 16 form a recuperator 30 which, for example, has an outside diameter D of 130 mm (FIG. 2), a length L of 400 mm (FIG. 3) and consists for example of 72 pipes. In FIG. 3 one heat exchanger pipe 16 of this recuperator 30 is shown representative for all other heat exchanger pipes. The heat exchanger pipe has a flattened section 31 for heat exchange and end sections 32, 33 as well as intermediate transition sections. As is shown by FIGS. 4 and 5, the section 31 has a different cross-section than the section 33 (FIG. 5) or the section 32. The section 31 defines a gap cross-section 34 having a gap length b that preferably is more than four times the gap width s. Referring to the present exemplary embodiment, for example, s=1.5 mm and b=15 mm, each measured from inside area to inside area of the gap cross-section 34. As opposed to this, the section 33 defines a nozzle cross-section 35 having, for example, a diameter d=2.5 mm. Consequently the area of the gap cross-section 34 is greater than that of the nozzle cross-section 35.

The nozzle cross-section 35 may be formed integrally with the heat exchanger pipe 16 or it may be formed by an attached component. In addition, the section 33 may be straight or, as shown, bent in a simple, arcuate or also s-shaped manner. The heat exchanger pipe is manufactured, for example, starting with a pipe having a larger diameter. The pipe is tapered at its ends 36, 37, for example, by means of an appropriate forming process, as is shown by FIG. 6. The original diameter is maintained in a section 38 located between the ends 36, 37. The thusly produced preform 39 of the heat exchanger pipe 16 has initially also a circular cross-section as shown in FIG. 7. This circular cross-section is subsequently flattened during a plastic deforming process in order to produce the gap cross-section 34 as shown in FIG. 4.

Preferably, the gap cross-section 34 is delimited by flat walls 40, 41. As is shown in FIG. 8, the wall 40 and/or the wall 41 may be provided with same-size or different-size nubs 42 that extend into the gap cross-section 34 and are preferably in contact with each other. These nubs 42 form a support for the walls 40, 41 in order to prevent the gap cross-section 34 from collapsing. The nubs 42 can also be used to create a welding joint between the walls 40, 41. This allows the construction of particularly thin-walled heat exchanger pipes 16.

The recuperator burner 1 as described so far has a total heat transfer surface of for example 0.95 m². It operates as follows:

For heating up the furnace space 2, natural gas is supplied via the warm-up gas connection 6, and air is supplied via the warm-up air connection 8, for example. A flame is ignited in the combustion chamber 10, whereby the hot exhaust gases of said flame enter into the furnace space 2 in order to heat said space. Once this has taken place, the recuperator burner 1 may go into FLOX® mode.

To do so, the air supply to the FLOX® air connection 7 and the gas supply to the FLOX® gas connection 5 are reversed. The combustion air now flows through the heat exchanger pipes 16 into the furnace space and forms there the jets 43 as indicated in FIG. 1. The fuel is conducted through the fuel pipe 23 into the furnace space 2, as is indicated by an arrow 44. An exhaust gas recirculation is generated (arrow 45). Only a part of the circulatory combustion gas and exhaust gas reaches the exhaust gas channel 20 (arrow 46) and is discharged.

An air supply of 36 m³/h for the combustion of 35 kW natural gas is preheated from 20° C. to 880° C. when the exhaust gas flows at 1000° C. from the furnace into the recuperator 30. The exhaust gas temperature at the exhaust gas connection 9 is 300° C., and the exhaust gas loss is 14%. At half-load (17 kW), the air preheating temperature increases to 950° C., whereas the exhaust gas temperature decreases to 230° C., and the exhaust gas loss drops to 10%.

The seventy-two air jets formed at the open ends of the heat exchanger pipes 16 suck in a multiple amount of furnace gas over a short path length, so that the temperature in the reaction zone remains below 1500° C., thus suppressing the thermal NOx formation.

Comparison with Prior Art:

In the listing below, a ribbed recuperator pipe, as disclosed by EP 0 685 683 B1, for example, is compared with the flattened pipe recuperator in accordance with the present description:

|  | Ribbed Pipe | Flattened pipe |
| --- | --- | --- |
| Outside diameter | 130 mm | 130 mm |
| Effective length | 400 mm | 400 mm |
| Heat transfer area | 0.35 m² | 0.95 m² |
| Amount of material used | 15 kg | 7.5 kg |
| Exhaust gas entry temperature | 1000° C. | 1000° C. |
| Thermal output, net | 30 kW | 30 kW |
| Efficiency | 72% | 86% |
| Supplied energy (natural gas) | 41.7 kW | 34.9 kW |
| Exhaust gas loss | 11.7 kW | 4.9 kW |
| Air preheating | 540° C. | 880° C. |
| Exhaust gas temperature | 600° C. | 300° C. |
| NOx (with flameless oxidation) | <50 ppm | <50 ppm |
| Pressure loss | <60 mbar | <60 mbar |

It is apparent from the above table that, with the same burner volume, the energy consumption is lowered by 16.3% and, in addition, the use of materials can be reduced by 50%. Overall, a robust and highly efficient recuperator burner is provided. This burner comprises, optionally, at least one combustion chamber for warm-up mode and is otherwise set up for FLOX® mode. A transition operation is possible in that part of the fuel, for example, 10 to 40% of the fuel, is supplied to the combustion chamber 10, whereas the other part of the fuel is conducted, via the central fuel pipe 22, into the furnace space. Accordingly, one part of the combustion air of the combustion chamber 10 and another part are conducted through the recuperator 30 into the furnace space. In this way, it is possible to achieve a FLOX® operation in a not yet sufficiently heated furnace chamber. In cases of applications with very long warm-up phases or with furnace space temperature which is deliberately kept low, at least a part of the fuel is oxidized under FLOX® conditions, thus achieving an overall reduction of NOx emissions.

With the present invention, a reliable, highly efficient recuperator burner is provided. It comprises, at least optionally, a combustion chamber for warm-up operation and is otherwise set up for FLOX® operation. As the recuperator 30 for preheating combustion air by means of thermal exhaust gas energy operates in a counter-current mode, the heat exchanger is very efficient. pipes 16 are provided. The heat exchanger pipes 16 have, in a section 31 designed for heat exchange, a flattened gap cross-section 34 and, at their end 33 facing the volume 2, a gap cross-section 34 that is different from the nozzle cross-section 35.

Preferably, each of the heat exchanger pipes 16 has a tapered nozzle end 23 which has a circumference that is smaller than the circumference of the pipe sections 31 provided for heat exchange. The heat exchanger pipe 16 is preferably made from a seamless pipe as a single piece.

Reference Numerals:
1 Recuperator burner
2 Furnace space
3 Furnace wall
4 Burner head
5 FLOX® gas connection
6 Preheating gas connection
7 FLOX® air connection
8 Preheating air connection
9 Exhaust gas connection
10 Combustion chamber
11 Pipe
12 Flange plate
13 Flange
14 Pipe socket
15 Central axis
16 Heat exchanger pipe
17 Air distributor channel
18 Distributor channel
19 Connection
20 Exhaust gas channel
21 Pipe
22 Exhaust gas collector
23 Fuel pipe
24 Pipe
25 Gas exit openings
26 Screen plate
27 Ignition and monitoring electrode
28 Corrugated sheet metal elements
16a, 28a Catalytically active material
29 Strips
30 Recuperator
31, 32, 33 Section
34 Gap cross-section
35 Nozzle cross-section
36, 37 Ends
38 Section
39 Preform
40, 41 Walls
42 Nubs
43 Jets
44, 45, 46 Arrow

What is claimed is:

1. A recuperator burner (1) for heating a chamber volume (2) in which combustion gas is circulated, said recuperator burner comprising:

a central fuel supply pipe (23) for injecting fuel into the chamber volume (2), a recuperator (30) disposed annularly around the central fuel supply pipe (23) for preheating combustion air by means of hot exhaust gas conducted out of the chamber volume (2) in a counter-current heat exchange with the combustion air supplied to the chamber volume (2), the recuperator (30) comprising heat exchanger pipes (16) with circular inlet end sections mounted in a flange plate (12), with circular outlet end sections which are bent inwardly toward the central fuel supply pipe (23) and with flattened straight center sections (31) providing for a narrow internal pipe gap cross-section (34) in the center section (31) for improved heat exchange, and each heat exchanger pipe (16) having at its discharge end (33) facing the chamber volume (2) a reduced diameter end forming a nozzle with a nozzle cross-section (35) which is smaller than the narrow internal pipe gap cross-section (34).

2. The recuperator burner as in claim 1, wherein the internal pipe gap cross-section (34) has a gap length b and a gap width s, selected so that said gap length b has a size that is at least four times the gap width s.

3. The recuperator burner as in claim 1, wherein the heat exchanger pipes (16) have a circular cross-section at the air-entry end thereof.

4. The recuperator burner as in claim 1, wherein, at their air-entry end (32), the heat exchanger pipes (16) are fastened to a flange plate (12).

5. The recuperator burner as in claim 1, wherein at least one of the heat exchanger pipes (16) is connected to a connector (19) through which fuel can at least optionally be supplied.

6. The recuperator burner as in claim 1, wherein at least one corrugated sheet metal element (28) is arranged adjacent the heat exchanger pipes (16).

7. The recuperator burner as in claim 6, wherein the corrugated sheet metal element (28) is provided, at least partially, with a catalytically active material (28a).

8. The recuperator burner as in claim 1, wherein at least one of the heat exchanger.pipes (16) is provided, at least at one point, with a catalytically active material (16a).

9. The recuperator burner as in claim 1, wherein each of the heat exchanger pipes (16) has at least one tapered end (33) having a circumference that is smaller than the circumference of the pipe section (31) provided for heat exchange, said heat exchanger pipe (16) being a seamless pipe formed as a single piece.

* * * * *